United States Patent [19]

Sparapany et al.

[11] Patent Number: 4,868,248

[45] Date of Patent: Sep. 19, 1989

[54] POLYHYDROXYAMIC ACID POLYMERS FROM POLYACRYLIC ACIDS

[75] Inventors: John W. Sparapany, Bolingbrook; Dodd W. Fong, Naperville; Josepha M. Fu, Chicago, all of Ill.

[73] Assignee: Nalco Chemical Company, Naperville, Ill.

[21] Appl. No.: 327,482

[22] Filed: Mar. 22, 1989

[51] Int. Cl.$^4$ .............................................. C07F 8/32
[52] U.S. Cl. ................................ 525/380; 525/329.9; 560/205; 528/332
[58] Field of Search ........................... 525/329.9, 380; 528/332; 560/205

[56] References Cited

U.S. PATENT DOCUMENTS

| Re. 28,474 | 7/1974 | Anderson et al. | |
|---|---|---|---|
| 2,402,604 | 6/1946 | Coffman | 525/327.6 |
| 3,154,499 | 10/1964 | Fetscher | |
| 3,284,393 | 11/1966 | Vanderhoff et al. | |
| 3,345,344 | 10/1967 | Fetscher et al. | |
| 4,587,306 | 5/1986 | Vio et al. | 525/380 |

FOREIGN PATENT DOCUMENTS

| 560782 | 4/1960 | Belgium . |
| 852176 | 10/1960 | United Kingdom . |
| 887175 | 1/1962 | United Kingdom . |

OTHER PUBLICATIONS

"The Synthesis of Poly(Hydroxamic Acid) from Poly(Acrylamide)" by A. J. Domb, E. G. Cravalho, R. Langer from *J. Polymer Science*, Dec. 1987.
Chemical Abstract 77(24):153114e.
Chemical Abstract 94(14):104189a.
"Hydroxylamine in the High-Temperature Dyeing of Acrylic Fibres" *Jo. Soc. Dyers & Colourists*, vol. 75, 1959, by F. Schouteden, p. 309.
Chemical Abstract 65, 15532g, 1966.
"Chelating Ion-Exchangers Containing Salicyclic Acid" by F. Vernon and H. Eccles, *Analytica Chimica Acta*, 72 (1974) 331–338.
"Chelating Ion-Exchangers Containing N-Substituted Hydroxylamine Functional Groups, Part I., N-Aroylphenylhydroxylamines", by F. Vernon and H. Eccles, *Analytica Chimica Acta*, 77 (1975) 145–152.
"Chelating Ion-Exchangers Containing N-Substituted Hydroxylamine Functional Groups, Part II., N-Acylphenylhydroxylamines" by F. Vernon and H. Eccles, *Analytica Chimica Acta*, 79 (1975) 229–236.
"Chelating Ion-Exchangers Containing N-Substituted Hydroxylamine Functional Groups, Part III., Hydroxamic Acids" by F. Vernon and H. Eccles, *Analytica Chimica Acta*, 82 (1976) 369–375.
"Chelating Ion-Exchangers Containing N-Substituted Hydroxylamine Functional Groups, Part IV., Column Separations on a Hydroxamic Acid Resin", by F. Vernon and H. Eccles, *Analytica Chimica Acta*, 83 (1976) 187–193.
"Chelating Ion-Exchangers Containing N-Substituted Hydroxylamine Functional Groups, Part V., Iron, Copper and Uranium Separations on Duolite CS-346 Resin", by F. Vernon and H. Eccles, *Analytica Chimica Acta*, 94 (1977) 317–322.
Chemical Abstract 99(26):224042x.
"Chelating Ion Exchangers—the Synthesis and Uses of Poly (Hydroxamic Acid) Resins" by F. Vernon, *Pure & Appl. Chem.*, vol. 54, No. 11, pp. 2151–2158, 1982.

*Primary Examiner*—Joseph L. Schofer
*Assistant Examiner*—T. McDonald, Jr.
*Attorney, Agent, or Firm*—John G. Premo; Anthony L. Cupoli; Donald G. Epple

[57] ABSTRACT

Polyacrylic acid polymers are modified with hydroxylamine to convert a portion of the acrylic acid groups in the polymer to hydroxamic acid groups. The process requires utiization of a pH between 1–6 and a temperature ranging between 70°–150° C.

2 Claims, No Drawings

POLYHYDROXYAMIC ACID POLYMERS FROM POLYACRYLIC ACIDS

INTRODUCTION

Hydroxamic acid polymers derived from water-soluble polymers such as acrylamide or acrylamide acrylic acid copolymers are well known. They are synthesized by reacting polyacrylamide with hydroxylamine. An excellent summary of this technology can be found in the paper "The Synthesis of Poly(hydroxamic Acid) from Poly(Acrylamide)", by A. J. Domb, E. G. Cravalho & R. Langer, *Journal of Polymer Science*, December 1987. This paper, and in particular that portion of the Bibliography nos. 17-26, are incorporated herein by reference.

Little work has been done in directly converting water-soluble carboxyl acid polymers such as polyacrylic or methacrylic acid into hydroxamic acids containing copolymers.

The present invention is therefore directed to a method of converting a portion of the carboxylic acid groups in water-soluble polyacrylic acid polymers into hydroxamic acid groups.

THE INVENTION

The invention comprises a method of producing a polyacrylic acid which contains from between 5-40% of its carboxylic acid groups converted to hydroxamic acid groups which comprises reacting an aqueous solution, suspension or emulsion of polyacrylic acid, which solution, suspension or emulsion contains at least 5% by weight of polyacrylic acid with hydroxylamine at a pH of 1-6 and a temperature range between 75°-145° C.

THE STARTING ACRYLIC ACID POLYMERS

These polymers may have a molecular weight ranging from as little as 500 to as much as several million. The most useful polymers for most industrial applications required that the molecular weight be within the range of 3-5,000 to two million. The molecular weight range selected will depend upon the end use of the hydroxamic polymer.

The reaction of the hydroxylamine with the polyacrylics is converted in water. A most common form of polyacrylic acids in water are aqueous solutions of these polymers. These solutions when used to practice the invention should contain from 5% up to 10-35% or more of polyacrylic acid. It is also possible to use aqueous slurries of polyacrylic acids or the polyacrylic acids may be in the form of concentrated water-in-oil emulsions. Emulsions of this type are described in U.S. Pat. No. 3,284,393 and U.S. Pat. No. RE 28,474, both of which are incorporated herein by reference.

The amount of polyacrylic acid will vary as indicated depending upon the aqueous systems used as well as the viscosity of such system.

pH

The pH of the system during the reaction should be lower than about 6. This pH can be achieved from either the polyacrylic acid itself or by the addition of buffering agents that do not interfere with the conversion of the hydroxylamine into hydroxamic acid.

The preferred pH used in the practice of the invention is 3-4. pH's greater than about 6 do not produce the polymers of the invention after 8 hours of heating.

TEMPERATURE

The temperature may range above 75° C. up to 145° C. with 95° C. being preferred. At 150° C., decomposition of hydroxylamine becomes significant, reducing the yield of the reaction.

REACTION TIME

A typical reaction time is 5 hours although times ranging between 3-24 hours may be used depending upon the temperature employed, the concentrations of the reactors, and pH of the mixture. At pH greater than 6 and reaction temperature less than 70° C., the reaction proceeds very slowly thereby making the reaction at these conditions impractical.

YIELD

The yield will depend upon the hydroxylamine used in relation to the carboxylic acid content of the starting polymer. Depending upon the end use, typical materials will contain between 30-40% of the carboxylic groups converted. In certain instances it may be desirable to convert only 5% of the carboxylic groups. In any event conversion is achieved using one mole of hydroxylamine for each carboxylic acid group in the acrylic acid polymer sought to be converted to carboxylic acid group.

Under the reaction conditions set forth above, it is difficult to convert much more than 40% of the carboxylic groups to hydroxamic acid groups.

GENERAL PREPARATIVE TECHNIQUE

Method A

A water-soluble polymer of polyacrylic acid of molecular weight ranging from 1,000 to 500,000 was mixed with hydroxylamine hydrochloride (5 to 100 mole percent) and pH adjusted with caustic or acid. The solution was placed in a glass tube, sealed, and heated in an oil bath set at 90°-95° C. for 5 to 8 hours (depending on the pH of the reaction). The mixture was then cooled and analyzed by carbon NMR.

Method B

A water-swellable polymer of polyacrylic acid, was mixed into a solution of hydroxylamine hydrochloride (5 to 100 mole percent), pH pre-adjusted with acid or caustic. The mixture was sealed in a glass tube and heated in an oil bath maintained at 90° to 95° C. for a period of time greater than 3 hours. The mixture was then cooled and the composition of the product determined by carbon NMR analysis.

EVALUATION OF INVENTION

To illustrate the typical products of the invention as prepared as described above, Table I is presented below:

TABLE I

Typical NMR Spectra Summary

| Example No. | Polymer Backbone Composition[1] AA/ACAM[3] | Product Composition[1] HA/AA/ACAM[3] | Solution pH | Chemical Shifts (ppm)[2] HA/AA/ACAM[3] |
|---|---|---|---|---|
| 1 | 50/50 | 5/54/41 | 10.0 | 169/183/181 |
| 2 | 100/0 | 25/75/0 | 3.3 | 175/181/ |
| 3 | 100/0 | 30/70/0 | 4.0 | 175/183/ |

[1]Composition in mole percent based on total mer units.
[2]Chemical shifts will vary as pH varies.
[3]HA = hydroxamic acid
AA = acrylic acid
ACAM = acrylamide

TABLE II

Polyacrylic Acid Modification (Hydroxylamine)

| Test No. | Polymer MW[1] | Amine Charge[4] | Rxn. pH[2] | Rxn. Time | Rxn. Temp. | Final Polymer Comp. HA/AA[3] |
|---|---|---|---|---|---|---|
| 1 | 10,400 | 1 | 3.3 | 5 hr. | 90° C. | 25/75 |
| 2 | 10,400 | 1 | 3.3 | 24 hr. | 25° C. | 0/100 |
| 3 | 10,400 | 1 | 4.1 | 5 hr. | 90° C. | 30/70 |
| 4 | 10,400 | 1 | 5.0 | 8 hr. | 90° C. | 2/98 |
| 5 | 10,400 | 1 | 5.0 | 8 hr. | 70° C. | 0/100 |
| 6 | 10,400 | 1 | 5.0 | 48 hr. | 60° C. | 0/100 |
| 7 | 10,400 | 1 | 6.0 | 8 hr. | 90° C. | 0/100 |
| 8 | 10,400 | 1 | 12.5 | 8 hr. | 90° C. | 0/100 |
| 9 | SAP[5] | 0.5 | 3.5 | 8 hr. | 90° C. | 20/80 |
| 10 | 10,400 | 1 | 4.0 | 8 hr. | 150° C. | Decomposition |

[1]MW - Molecular weight of starting polymer backbone as measured by a chromatographic method using polystyrene sulfonate standards.
[2]Reaction pH was adjusted before eating by the addition of caustic.
[3]Final polymer composition estimated from NMR data and reported in mole percent based on total mer units.
[4]Hydroxylamine charged to the reaction in equivalents based on total mer units.
[5]SAP - Superabsorbent polymer.

We claim:

1. A method of producing a polyacrylic acid which contains from between 5-40% of its carboxylic acid groups converted to hydroxamic acid groups which comprises reacting an aqueous solution, water-soluble, suspension or emulsion of polyacrylic acid, which solution, suspension or emulsion contains at least 5% by weight of polyacrylic acid with hydroxylamine at a pH of 1-6 and a temperature range between 75°-145° C.

2. The method of claim 1 where between 30-40% of the carboxylic acid groups are converted into hydroxamic acid groups; the pH of the reaction is within the range of 3-4 and the temperature is about 90° C.

* * * * *